May 24, 1938.　　A. HOEFFLEUR　　2,118,348
CONVEYER
Filed Jan. 13, 1936　　2 Sheets-Sheet 2
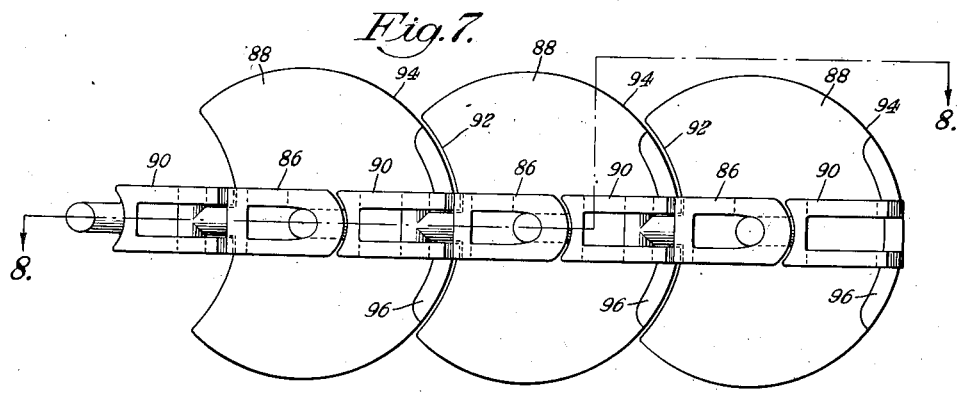
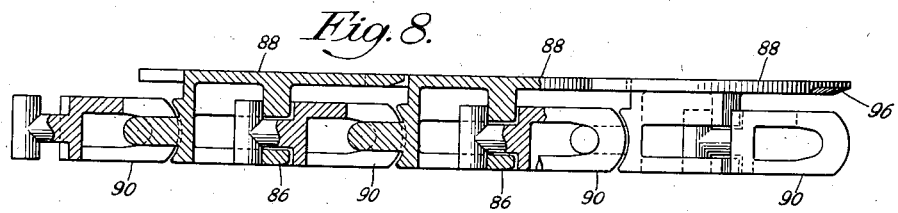
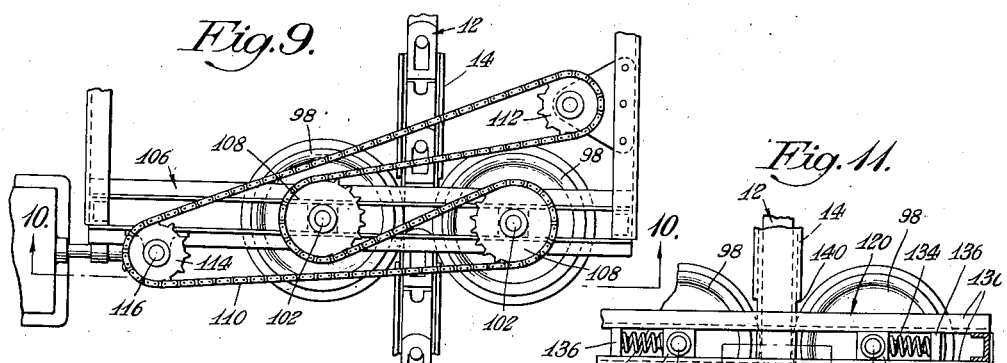
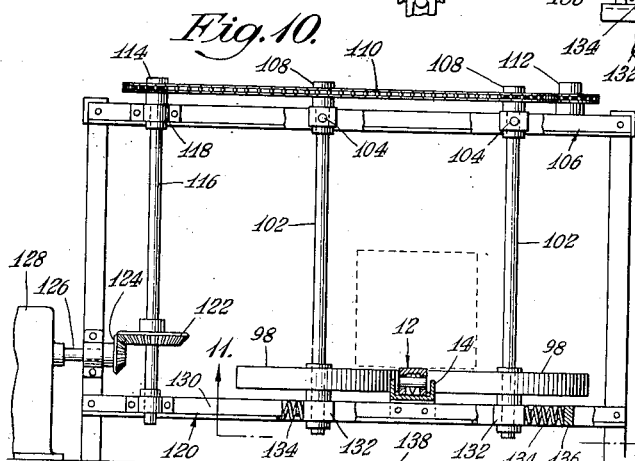
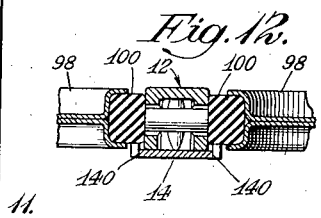
Arthur Hoeffleur
INVENTOR
BY Victor J. Evans & Co.
HIS ATTORNEYS Patented May 24, 1938

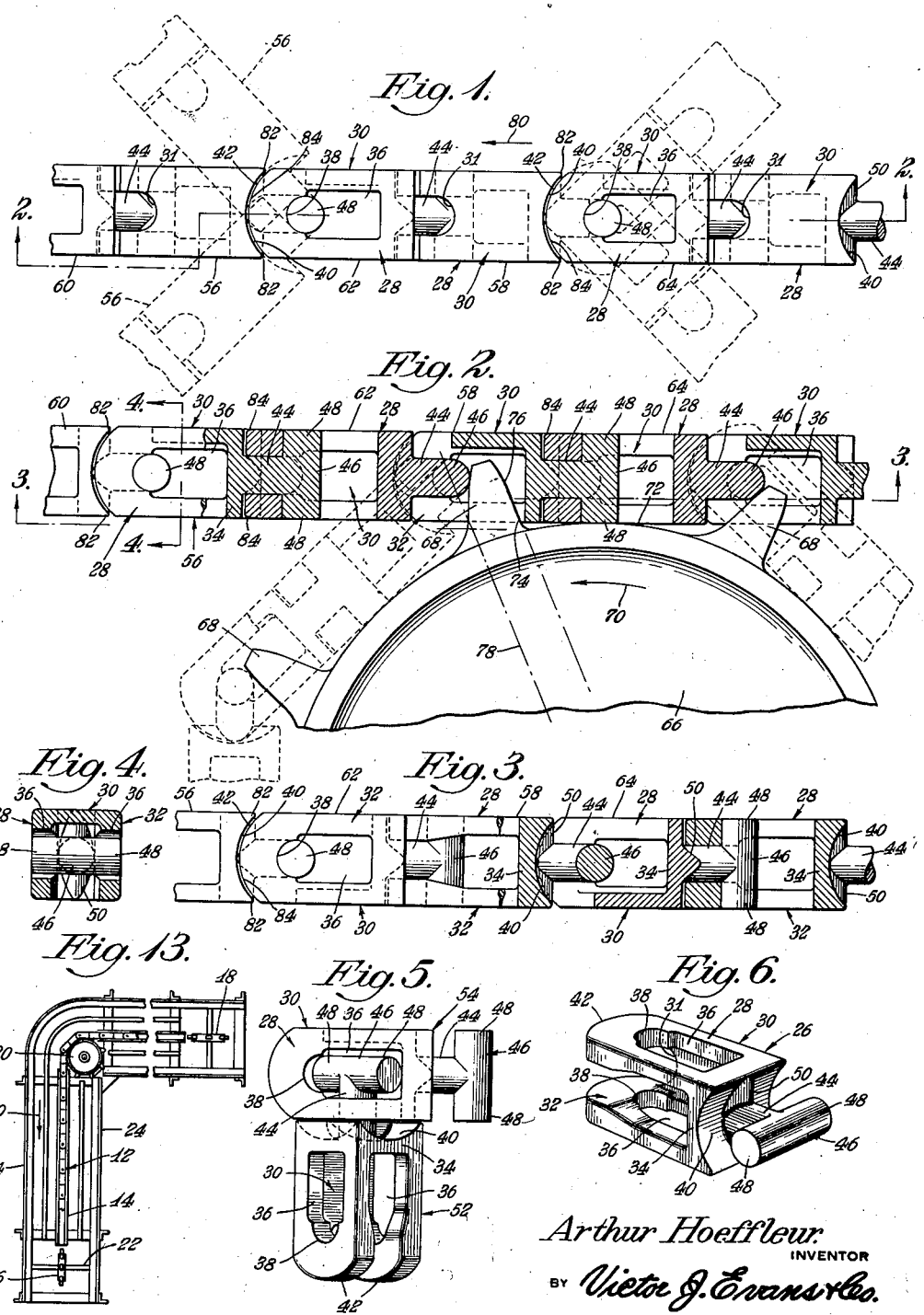

2,118,348

UNITED STATES PATENT OFFICE 2,118,348

CONVEYER

Arthur Hoeffleur, Chicago, Ill.

Application January 13, 1936, Serial No. 58,942

3 Claims. (Cl. 198—189)

My invention relates to conveyer systems, and includes among its objects and advantages the provision of an improved two-plane chain.

In the accompanying drawings:

Fig. 1 is a top plan view of a portion of a chain embodying my invention;

Fig. 2 is a sectional view along the line 2—2 of Fig. 1, illustrating the chain in association with a sprocket;

Fig. 3 is a sectional view along the line 3—3 of Fig. 2;

Fig. 4 is a sectional view along the line 4—4 of Fig. 2;

Fig. 5 is a perspective view illustrating the manner in which the links may be connected or disconnected;

Fig. 6 is a perspective view of one of the links;

Fig. 7 is a bottom plan view of a similar link construction in which links are provided with load supporting plates;

Fig. 8 is a sectional view along the line 8—8 of Fig. 7;

Fig. 9 is a diagrammatic top plan view of a friction drive for my chain;

Fig. 10 is a sectional view along the line 10—10 of Fig. 9;

Fig. 11 is a bottom plan view taken from the position indicated by line 11—11 of Fig. 10;

Fig. 12 is a sectional view along the line 12—12 of Fig. 11; and

Fig. 13 is a diagrammatic view illustrating an installation embodying the invention.

In the embodiment selected to illustrate my invention, Fig. 13 illustrates a conveyer designed for transporting packages such as cans, boxes, or the like. The commodities are moved in the direction indicated by the arrow 10 by the upper run of a chain 12. My chain travels in a guideway 14 in the nature of a channel (see Figs. 9 and 10). The vertical flanges of the channel terminate short of the plane defined by the upper surface of the chain so that the commodities being conveyed will ride on the chain and thus be moved along the conveyer.

In Fig. 13, the chain passes around end sprockets 16 and 18 and in intermediate sprocket 20 arranged so that the chain makes a turn of 90°. The sprocket 16 may be driven through the medium of any suitable source of power applied to the shaft 22 to which the sprocket is fixedly connected. Sprockets 18 and 20 may be of the idler type. While I have illustrated a sprocket 20 for the purpose of bending the chain, the link construction is such that wheels, shoes, or rollers may be employed in lieu of the sprocket. Guard rails 24 comprise a part of the conveyer frame structure to assist in holding the commodities to the path. These guard rails may be mounted in any well known manner. In lieu of a turn of 90° at the sprocket 20, the chain 12 may make a bend at any desired angle.

Fig. 6 illustrates one of my links. The chain 12 comprises a plurality of these links, which links are so designed that it is possible to use one type of link only in the composition of the chain. I design the link so that a plurality of identical units may be connected without the aid of separate connecting pins or devices and in which the links operate in such a manner that the chain may bend in two planes at right angles.

Specifically, the link 26 comprises three side walls 28, 30, and 32, cast integrally with an end wall 34. The side walls 28 and 32 are identical in construction, each being provided with an opening 36 terminating in a curved recess 38. The outer surface of the wall 34 is of concave configuration as indicated at 40, while the ends 42 of the walls 28 and 32 are shaped to conform to the curvature of the surface 40. The link proper is square in cross section, so that the wall surfaces of each lie in common planes with the same surfaces of all the links, thus making it possible to use the same link for alternate links.

A shank 44 is cast integrally with the curved face of the wall 34, which shank is also cast integrally with a shaft 46 arranged at right angles to the shank 44, the latter having its axis corresponding to the longitudinal axis of the link as a whole. The axis of the shaft 46 lies in parallel relation with the walls 28 and 32 with each end projecting beyond the shank 44 to provide trunnions 48. I prefer to provide reenforcement 50 at the base of the shank 44 for strengthening purposes in the vicinity of the connection between the shank and the wall 34.

In Fig. 5, I illustrate the manner in which the links may be connected or disconnected. The spacing between the walls 28 and 32 is slightly greater than the diameter of the shank 44 or the shaft 46 so that the latter elements may be moved between the same walls of a companion link for connecting purposes. In Fig. 5, I illustrate the shank 44 and the shaft 46 of the link 52 as being positioned between the walls 28 and 32 of the companion link 54. In connecting the two links, the link 52 is turned about its longitudinal axis for positioning the shaft 46 in parallel relation with the walls 28 and 32 of the link 54. At this time, the links are moved in the direction of each other after which the link 52 is rotated about the axis of the shank 44 for positioning its shaft 46 at right angles to the walls 28 and 32 of the link 52. At this time, the link 52 is moved to the left until the trunnions 48 lie within the recesses 38 of the link 54, at which time the link 54 may be pivoted about the trunnions 48 of the link 52 for bringing the two links into end to end relation.

When the links are arranged in end to end relation, the curved ends 42 of the link 54 lie in close relation with the curved surface 40 of the link 52. The curvature 42 is concentric with respect to the curvature of the recesses 38, which permits the links 52 and 54 to be pivoted about the axes of the trunnions 48.

In Fig. 1, I illustrate a portion of a chain made up of my links. In this view, the axes of the trunnions 48 of the links 56 and 58 lie in parallel relation in a horizontal plane, while the axes of the trunnions of the alternate links 60, 62, and 64 lie in parallel relation in a vertical plane. The wall 30 of each link is recessed at 31 to provide accommodation for the shank 44 of an adjoining link, to permit pivotal movement of the link in the two directions indicated by link 56, in Fig. 1.

It will be noted that each link is pivoted to an adjoining link upon an axis at right angles to the axis upon which it is pivoted to the other adjoining link. For bending purposes in any one plane, two adjoining links represent a unit and similar units adjoining such unit are movable in the same plane. When the chain is bent in the other plane, one link in each unit co-operates with one link in the adjoining unit to provide an operating unit.

An important feature of my link resides in the arrangement of the shaft 46 at right angles to the axes of the recesses 38. Because of this construction, the links may be connected without the aid of pins and tools, and the assembled links are articulated in such a manner as to provide a chain capable of bending in two planes.

In Fig. 2, I illustrate a sprocket 66 for driving the chain 12. The sprocket 66 is provided with widely spaced teeth 68 so that alternate links of the chain are engaged. The teeth 68 of the sprocket enter the spaces between the walls 28 and 32 of alternate links and engage the shafts 46 of alternate links. Arrow 70 indicates the direction of rotation of the sprocket. The peripheral surface 72 of the sprocket carries the chain 12. The rear faces of the teeth 68 are shaped to accommodate the end walls 34. The surface between the points 74 and 76 of each tooth is arranged in parallel relation with a straight line intersecting the axis of the shaft 46 associated with that tooth and the axis of the sprocket 66. The remaining surface from the point 76 to the end of the tooth is curved slightly so as to permit the tooth to enter its respective link without striking the end wall 34 of that link.

The leading faces of the teeth 68 are arranged at an angle to the line 78, but the angularity is such as to prevent any tendency of the chain to climb. The same type of sprocket is employed for flexing the chain in a horizontal plane.

Arrow 80 in Fig. 1 illustrates the direction of travel of the chain. Movement of the chain in this direction prevents the sharp corners 82 from catching the commodities carried by the chain in cases where the commodities are blocked on the line. The wall 28 may be tapered slightly at 84 to position its leading end slightly below its load carrying surface to prevent articles from catching the end.

The closed relation between the curved ends 42 and the curved surface 40 of an adjacent link prevents articles from passing between the links, which is particularly advantageous in connection with commodities having recessed bottoms or sharply defined flanges. The sharp corners 82 which lie in horizontal planes cannot catch on the commodities when the chain travels according to Fig. 1. It will be noted that the chain presents an unbroken load carrying surface.

A different form of load carrying surface is illustrated in Figs. 7 and 8. In this construction, the alternate links 86 are provided with plates 88, which may be integral with the link. The links 86 are connected by links 90 identical in construction, with the exception of the plates. All the links are constructed in the same way as the link previously described with the exception of the plates 88. These plates are somewhat crescent-shaped when viewed from above or below, with the concave edge 92 arranged in close relation with the convex edge 94 of an adjacent plate, these being concentric with the axis of the connecting link 90. Fig. 7 illustrates a bottom plan view of the plates. Each plate is tapered slightly at 96 to provide clearance between adjacent plates when the chain is flexed in one direction in a vertical plane. My plate feature permits the carrying of many types of commodities without the aid of additional guiding structure such as that indicated generally at 24 in Fig. 13.

In Figs. 9 and 10, I illustrate the manner in which my chain may be driven through the medium of friction wheels applied to the opposite vertical surfaces of the chain and driven in synchronism. Fig. 9 represents a top plan view in which the vertical sides of the chain are pinched between two friction wheels 98. Each wheel includes a friction surface such as a fiber or rubber tread 100 (see Fig. 12). The wheels 98 are fixedly connected with vertical shafts 102, each having a pivotal connection at 104 with an overhead structure 106. Sprockets 108 are fixedly connected with the shafts 102, which sprockets are driven through the medium of a chain 110 passing around an idler sprocket 112 and a power driven sprocket 114. The latter is connected with a shaft 116 rotatably mounted in bearings 118 carried by the supporting structure 106 and a lower supporting structure 120. I illustrate the shaft 116 as being provided with a bevel gear 122 arranged in mesh with a bevel gear 124 connected with a shaft 126 associated with a speed reducer 128 which may be driven through the medium of any suitable source of power.

Referring to Figs. 10 and 11, the lower supporting structure 120 includes two spaced members 130 between which bearings 132 are slidably mounted. These bearings support the lower ends of the shafts 102, which lower ends are urged in the direction of the chain 12 through the medium of compression springs 134. These springs are positioned between the bearings and abutments 136 fixedly connected with the members 130. Thus, the friction wheels 98 are caused to bear firmly against the sides of the chain 12 because of the springs 134 and pivotal bearings 104.

Because of the flat and the continuous nature of the vertical sides of my chain, friction drives may be employed, which type of drives may be advantageously used in connection with installations requiring the chain 12 to be located in slightly spaced relation with the floor 138. By proportioning the diameter of the wheels 98, space of desired amount is obtained between the shafts 104 to permit commodities to pass between the same as indicated in dotted lines in Fig. 10.

Referring to Figs. 9 and 11, the vertical flanges of the channel 14 are cut away at 140 to provide accommodation for the friction wheels 98. The upper horizontal surfaces of these wheels lie below the load carrying surface of the chain so as not to interfere with the movement of commodities.

All the links are of an open design which facilitates washing and cleaning of the links.

Without further elaboration, the foregoing will so fully explain my invention that others may, by applying current knowledge, readily adapt the same for use under various conditions of service.

I claim:

1. In a conveyer chain, a link comprising two spaced side walls interconnected by a third side wall, each wall being integrally connected with an end wall having a curved face, each of said two spaced side walls being provided with a curved recess and said recesses being concentric about a common axis, and a shank projecting from said curved face and being provided with a shaft having an axis positioned at right angles to said common axis, each of said two spaced side walls being provided with a curved end concentric about said common axis.

2. In a conveyer chain, a link comprising two spaced side walls interconnected by a third side wall, each wall being integrally connected with an end wall having a curved face, each of said two spaced side walls being provided with a curved recess and said recesses being concentric about a common axis, and a shank projecting from said curved face and being provided with a shaft having an axis positioned at right angles to said common axis, each of said two spaced side walls being provided with a curved end concentric about said common axis, said link being square in cross section.

3. In a conveyer chain, a link comprising two spaced side walls provided with openings terminating in curved recesses concentric about a common axis, an end wall integrally connected with said side walls and having a curved face, a shank projecting from said curved face and having an axis arranged in parallelism with said side walls, trunnions connected with said shank and having a common axis arranged at right angles to said first-named common axis, each of said side walls being provided with a curved end substantially concentric about said first-named common axis, the trunnions of one link being adapted to lie within said recesses of a companion link, to provide a pivotal connection between the links, a sprocket for driving the chain, the teeth of the sprocket being shaped and spaced to pass between the spaced side walls of alternate links and to engage the trunnions associated with said alternate links, each tooth having a rear face arranged in parallel relation with a straight line intersecting the axis of the trunnion engaged by that tooth and the axis of the sprocket, and a front face arranged at an angle to said line.

ARTHUR HOEFFLEUR.